United States Patent
Ogawa et al.

(10) Patent No.: US 10,158,308 B2
(45) Date of Patent: Dec. 18, 2018

(54) IDENTIFYING VOLTAGE TO PREVENT MOTOR INTEGRATED CIRCUIT DAMAGE

(71) Applicant: SEMICONDUCTOR COMPONENTS INDUSTRIES, LLC, Phoenix, AZ (US)

(72) Inventors: Takashi Ogawa, Ogaki (JP); Fumio Kumazawa, Ota (JP); Satoshi Yokoo, Ota (JP); Juichi Uno, Ota (JP)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 50 days.

(21) Appl. No.: 15/186,050

(22) Filed: Jun. 17, 2016

(65) Prior Publication Data
US 2017/0366122 A1    Dec. 21, 2017

(51) Int. Cl.
G05B 9/02    (2006.01)
H02P 7/03    (2016.01)
H02P 29/024    (2016.01)

(52) U.S. Cl.
CPC ............... H02P 7/05 (2016.02); H02P 7/03 (2016.02); H02P 29/024 (2013.01)

(58) Field of Classification Search
CPC ........ G05B 9/02; G05B 19/4062; B25J 19/06; B25J 9/1674; G05D 1/0077
USPC ...................... 318/563, 569, 600; 388/907.5
See application file for complete search history.

(56) References Cited

U.S. PATENT DOCUMENTS

| | | | | |
|---|---|---|---|---|
| 5,732,375 A | * | 3/1998 | Cashler | G06K 9/00362 180/273 |
| 6,181,141 B1 | * | 1/2001 | Juntunen | G01R 27/08 324/525 |
| 6,545,489 B1 | * | 4/2003 | Nitschke | G01L 1/2262 324/691 |
| 7,567,045 B2 | * | 7/2009 | Fristedt | B60N 2/5685 318/400.01 |
| 8,018,186 B2 | * | 9/2011 | Frankel | H02P 3/22 318/400.26 |
| 2004/0078101 A1 | | 4/2004 | Kondoh et al. | |
| 2004/0157091 A1 | * | 8/2004 | Dewey | B60L 3/0069 205/337 |
| 2006/0179047 A1 | | 8/2006 | Bresemann et al. | |
| 2012/0161680 A1 | | 6/2012 | Kitagawa | |
| 2014/0139153 A1 | | 5/2014 | Aoki | |

(Continued)

FOREIGN PATENT DOCUMENTS

| | | |
|---|---|---|
| JP | 62-205416 | 9/1987 |
| JP | 10-177403 | 6/1998 |

(Continued)

*Primary Examiner* — Rina Duda
(74) *Attorney, Agent, or Firm* — IPTechLaw (57) ABSTRACT

A motor control system, in some embodiments, comprises: a voltage divider circuit having an output node, a voltage on said output node representing a desired motor rotation direction; control logic configured to receive an indication of said voltage; and a motor controller coupled to the control logic, wherein, if said indication of the voltage on the output node falls outside of a predetermined range, the control logic is configured to issue a motor stop signal to the motor controller indicating that at least one resistor of the voltage divider circuit is defective or is missing from the voltage divider circuit.

19 Claims, 4 Drawing Sheets

(56) References Cited

U.S. PATENT DOCUMENTS

| | | | |
|---|---|---|---|
| 2014/0184252 A1* | 7/2014 | Jefferies | G01R 31/026 324/750.01 |
| 2015/0064023 A1 | 3/2015 | Sasaki et al. | |
| 2015/0130384 A1 | 5/2015 | Mahdavi et al. | |
| 2015/0180388 A1 | 6/2015 | Ogawa | |
| 2015/0180390 A1 | 6/2015 | Ogawa | |

FOREIGN PATENT DOCUMENTS

| | | |
|---|---|---|
| JP | 11-015364 | 1/1999 |
| JP | 2000-091923 | 3/2000 |
| JP | 2004-310846 | 11/2004 |
| JP | 2008-131805 | 6/2008 |
| JP | 2011-196723 | 10/2011 |
| JP | 2012-119767 | 6/2012 |
| JP | 2013-132200 | 7/2013 |

* cited by examiner

| INDEX | ANALOG VOLTAGE GROUP (V) | DIGITAL BIT VALUE | MOTOR STOP SIGNAL | ROTATION DIRECTION |
|---|---|---|---|---|
| 0 | 0.31 | 0000 | 1 | N/A |
| 1 | 0.63 | 0001 | 1 | N/A |
| 2 | 0.94 | 0010 | 0 | 0 |
| 3 | 1.25 | 0011 | 0 | 0 |
| 4 | 1.56 | 0100 | 0 | 0 |
| 5 | 1.88 | 0101 | 0 | 0 |
| 6 | 2.19 | 0110 | 0 | 0 |
| 7 | 2.50 | 0111 | 0 | 0 |
| 8 | 2.81 | 1000 | 0 | 1 |
| 9 | 3.13 | 1001 | 0 | 1 |
| 10 | 3.44 | 1010 | 0 | 1 |
| 11 | 3.75 | 1011 | 0 | 1 |
| 12 | 4.06 | 1100 | 0 | 1 |
| 13 | 4.38 | 1101 | 0 | 1 |
| 14 | 4.69 | 1110 | 1 | N/A |
| 15 | 5.00 | 1111 | 1 | N/A |

FIG. 5

FIG. 6

IDENTIFYING VOLTAGE TO PREVENT MOTOR INTEGRATED CIRCUIT DAMAGE

BACKGROUND

Certain motors, such as those used to power car seat cooling fans, are designed to rotate in both clockwise and counter-clockwise directions. The direction in which such a motor is rotating at any given time is controlled by an input pin on the motor integrated circuit (IC), sometimes known as the SET pin. Typically, applying a SET pin voltage that is below a particular threshold causes the motor to spin in one direction, and applying another SET pin voltage that is above that threshold causes the motor to spin in the other direction.

The SET pin of the motor IC is often coupled to a voltage divider circuit that provides an appropriate voltage to the SET pin. The voltage divider circuit contains one or more resistors, sometimes called "bleeder resistors." One or both of these resistors can become defective or become detached from the voltage divider circuit—for example, due to excessive jostling or external vibration. When this occurs, the motor—which is rotating in one direction—may immediately begin to rotate in the opposite direction. This abrupt change in rotational direction draws a significant current through the motor IC, thus damaging the motor IC.

SUMMARY

At least some of the embodiments disclosed herein are directed to motor control system, comprising: a voltage divider circuit having an output node, a voltage on said output node representing a desired motor rotation direction; control logic configured to receive an indication of said voltage; and a motor controller coupled to the control logic, wherein, if said indication of the voltage on the output node falls outside of a predetermined range, the control logic is configured to issue a motor stop signal to the motor controller indicating that at least one resistor of the voltage divider circuit is defective or is missing from the voltage divider circuit. At least some of these embodiments may be supplemented using one or more of the following concepts, in any order and in any combination: further comprising an analog-to-digital converter (ADC) positioned between said output node and said control logic; wherein said indication of the voltage is one of a predetermined number of digital bit values output by said ADC based on the voltage on said output node; wherein said predetermined number is sixteen; wherein the control logic issues the motor stop signal if said indication of the voltage is one of the two highest or one of the two lowest of said sixteen digital bit values when the sixteen digital bit values are sorted in ascending order; wherein said indication of the voltage is an analog voltage or a digital bit value; wherein the motor controller controls a car seat cooling fan in accordance with said motor stop signal; wherein, if said indication falls within said predetermined range, the control logic issues a directional signal to the motor controller that indicates whether a motor should rotate clockwise or counter-clockwise; wherein said predetermined range is the middle 75% of a defined set of possible values of said indication when said possible values are sorted in ascending order.

At least some embodiments are directed to a computer-readable medium comprising code, which, when executed, causes a processor to: receive an indication of a voltage present on an output node of a voltage divider circuit, said voltage represents a desired motor rotation direction; determine whether said indication of the voltage falls outside a predetermined range; and issue a motor stop signal to a motor controller if said indication of the voltage falls outside the predetermined range, wherein said motor stop signal represents that at least one resistor of the voltage divider circuit is defective or missing. At least some of these embodiments may be supplemented using one or more of the following concepts, in any order and in any combination: wherein said voltage on the output node is configured to range between 0 and 5 Volts, and wherein said indication of the voltage on the output node is a digital bit value selected from a range between 0000 and 1111, inclusive; wherein each digital bit value in said range of digital bit values is assigned to a corresponding analog voltage group, and wherein each analog voltage group falls within a range of possible voltages on said output node; wherein said predetermined range is the middle 75% of a defined set of possible values of said indication; wherein the motor controller is a car seat cooling fan motor controller.

At least some embodiments are directed to a method for controlling a motor, comprising: obtaining an indication of a voltage present on a voltage divider circuit output node; determining whether said indication falls outside a predetermined range; issuing a motor stop signal if said indication of the voltage falls outside the predetermined range, said motor stop signal represents that at least one resistor of the voltage divider circuit is defective or missing; and stopping a motor based on the motor stop signal. At least some of these embodiments may be supplemented using one or more of the following concepts, in any order and in any combination: further comprising quantizing said voltage on the voltage divider circuit output node to obtain said indication; wherein said predetermined range corresponds to the middle 90% of a defined set of digital bit values; further comprising rotating said motor in a direction determined using said indication; wherein said motor is a car seat cooling fan motor; wherein said indication is selected from a group of sixteen digital bit values.

The specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims. The term "couple" and variants thereof, as used herein, indicate a direct or indirect connection.

DETAILED DESCRIPTION

Disclosed herein is a technique for protecting a motor integrated circuit (IC) from damage resulting from a compromised voltage divider circuit at the SET pin (i.e., the pin controlling motor rotation direction) of the IC. The technique entails monitoring the voltage that the voltage divider circuit provides to the SET pin and, when the voltage falls outside the scope of a predetermined range, issuing a stop signal to the motor controller that stops motor rotation.

Figure 1:
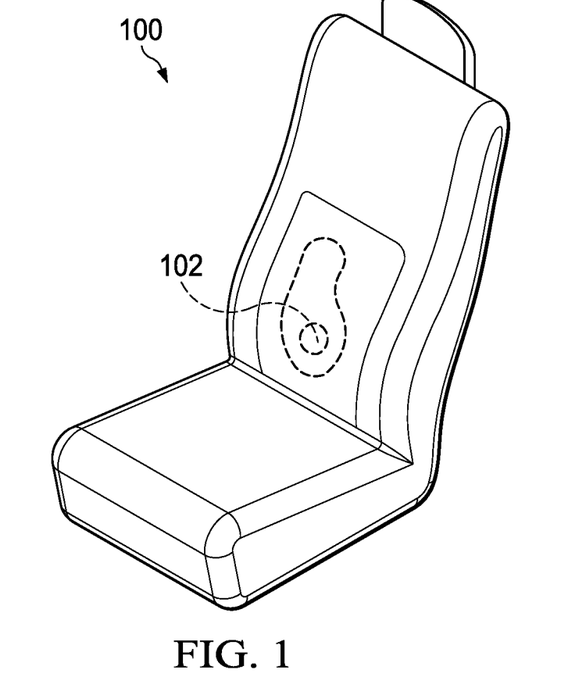
FIG. 1 is a perspective view of a car seat containing a car seat cooling fan.

FIG. 1 is a perspective view of a car seat 100. The fan 102 may operate to cool a person resting in the car seat 100 by causing air to circulate within or adjacent to the material (e.g., leather, fabric) with which the car seat 100 is upholstered. The fan 102 is not limited to installation in cars and may be installed in any type of vehicle, including pickup trucks, sport utility vehicles, crossovers, freight trucks, helicopters, airplanes, trains, and the like. The fan 102 contains a motor that is designed to rotate in both the clockwise and counter-clockwise directions. As described below, the motor system of fan 102 implements a technique that protects the motor IC from the type of abrupt rotation reversal damage described above. The embodiments described herein are not limited to implementation in car seat cooling fans; instead, the embodiments may be implemented in any application that entails the use of a motor that switches rotational direction.

Figure 2:
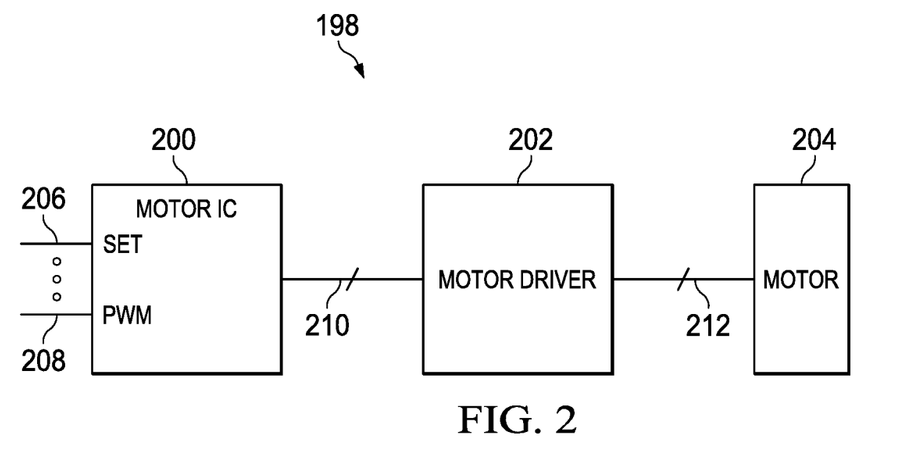
FIG. 2 is a block diagram of a motor system.

FIG. 2 is a block diagram of a motor system 198 in which the motor IC-preserving technique is implemented. The motor system 198 may be housed within any suitable device that requires a motor, such as the car seat cooling fan 102 shown in FIG. 1. The motor system 198 comprises a motor IC 200; a motor driver 202; a motor 204; a SET pin input node 206; a pulse width modulation (PWM) pin input node 208; one or more output signals 210 of the motor IC 200; and an output node 212 of the motor driver 202. The motor IC 200 controls various facets of the motor driver 202 and, by extension, of the motor 204. For instance, and without limitation, the SET pin of the motor IC 200 (which may be labeled differently, depending on the IC) controls the direction in which the motor 204 rotates. A SET pin voltage that is within a specific range may cause the motor 204 to rotate clockwise, and a SET pin voltage that is within a different range may cause the motor 204 to rotate counter-clockwise. Other SET pin schemes are contemplated. Similarly, the PWM pin of the motor IC 200 may control the duty cycle of the motor 204, regardless of the rotational direction. Additional input pins may be provided on the motor IC 200 to control other facets of the operation of motor 204. Depending at least in part on the inputs provided to the input pins of the motor IC 200, the motor IC 200 generates one or more output signals 210 that determine the behavior of the motor driver 202. The motor driver 202, in turn, drives the motor 204 in accordance with the output signals received from the motor IC 200, such as with a specific rotational direction and with a specific duty cycle.

Figure 3:
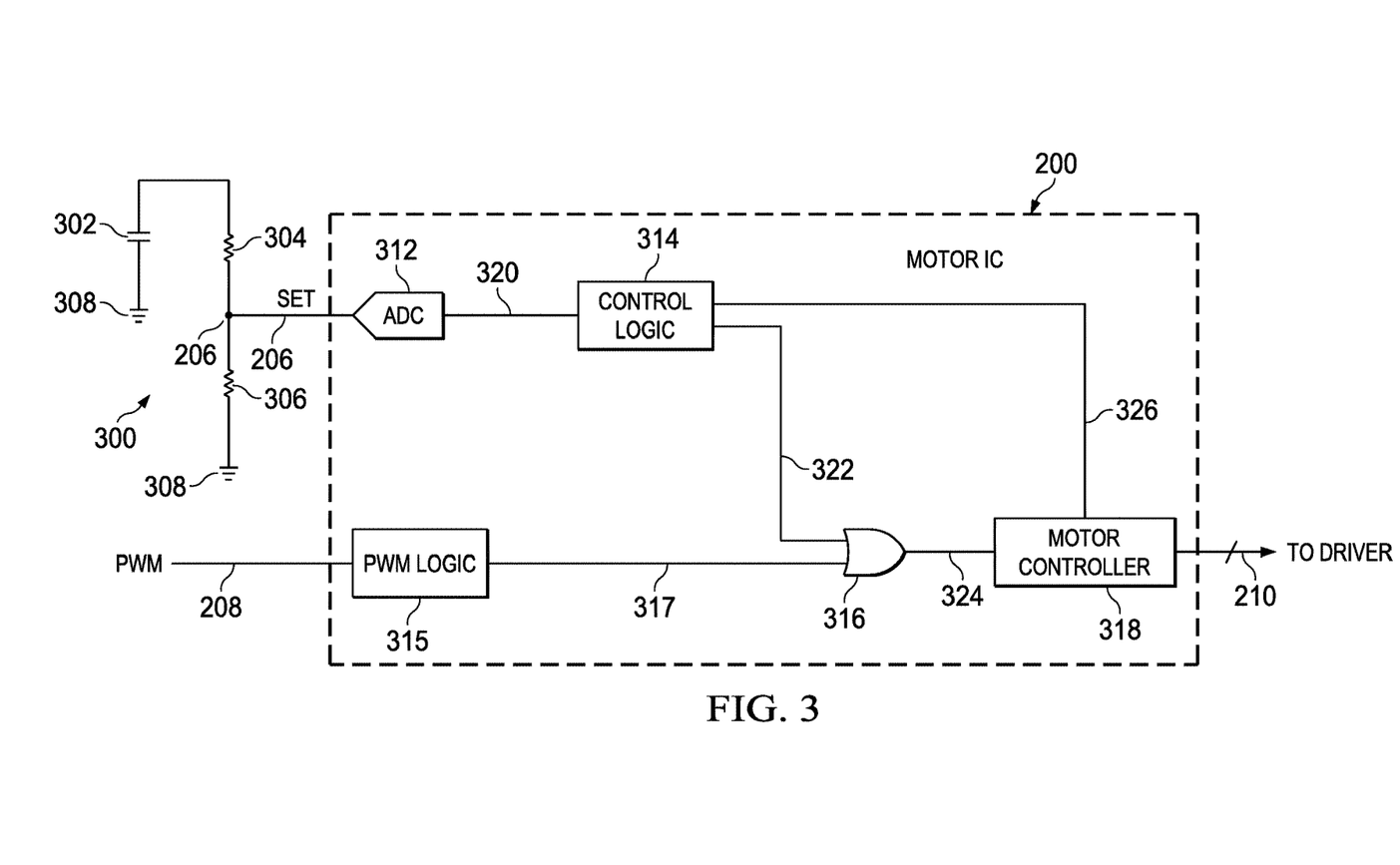
FIG. 3 is a block diagram of a motor integrated circuit (IC).
Figure 4:
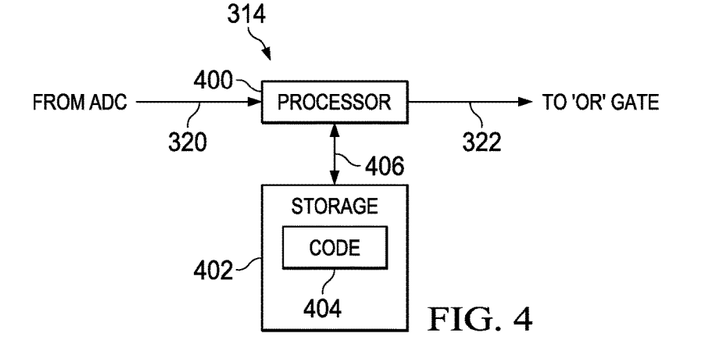
FIG. 4 is a block diagram of control logic within a motor IC.

FIG. 3 is a more detailed block diagram of the motor IC 200 and also depicts a voltage divider circuit 300 coupled to the SET pin input node 206. The motor IC 200 includes an analog-to-digital converter (ADC) 312; control logic 314; PWM logic 315; an OR logic gate 316; and a motor controller 318. The ADC 312 may be any suitable type of converter, such as a sigma-delta converter, that can convert analog input signals on the SET pin input node 206 to corresponding digital bit values. The control logic 314 includes any suitable type of hardware, software and/or firmware that can receive the digital bit values from the ADC 312 and determine, based on those digital bit values, whether the motor controlled by the motor IC 200 should be stopped due to a compromised voltage divider circuit 300. FIG. 4 is a block diagram of the control logic 314. The control logic 314 includes a processor 400 that couples to storage 402 (e.g., random-access memory (RAM) or read-only memory (ROM)) via node 406. The storage 402 stores code 404 (e.g., software and/or firmware) that can be executed by the processor 400 to perform some or all of the functions attributed herein to the control logic 314. The processor 400 receives inputs on node 320 and provides outputs on node 322 (output node 326 is omitted from FIG. 4). The architecture shown in FIG. 4 is merely illustrative. Any suitable architecture that enables the control logic 314 to perform the functions attributed to it herein may be implemented.

Referring again to FIG. 3, the motor controller 318 comprises any suitable hardware (e.g., a processor), software and/or firmware that are necessary to control the motor driver and, by extension, the motor. The PWM logic 315 is described below. In some embodiments, the various components of the motor IC 200 depicted in FIG. 3 are discrete components; however, the scope of disclosure is not limited as such, and the components within the motor IC 200 may be designed as desired as long as the functionalities described herein are implemented.

The voltage divider circuit 300 includes a voltage source 302 (e.g., 5 Volts); a resistor 304 (e.g., 10 kilo Ohms); another resistor 306 (e.g., 10 kilo Ohms); and ground connections 308. The SET pin input node 206 is positioned between the resistors 304 and 306, as shown, and it is alternatively referred to as the output node of the voltage divider circuit 300.

Voltage divider circuits are commonly found in many motor systems. One function of such circuits is to ensure the proper provision of a SET pin voltage so that the motor rotates in a desired direction. As explained above, however, in many instances one or both of the resistors in the divider circuit may become defective or may become detached from the voltage divider circuit. In such instances, the signal provided on the SET pin input node of the motor IC will cause the motor to immediately reverse rotational direction, thus damaging the motor IC. The motor IC 200, however, is designed to detect when the voltage divider circuit 300 has been compromised in this manner and to issue a motor stop signal to the motor controller 318, thus preventing the motor from suddenly reversing rotational direction and, by extension, preventing damage to the motor IC 200. Accordingly, the operation of the motor IC 200 is now described.

The analog voltage on the SET pin input node 206 has a range of possible values—for instance, between 0 and 5 V. The ADC 312 quantizes the analog voltage detected on the node 206 to one of a defined set of digital bit values. The precise number of digital bit values in the set varies, but, in at least some embodiments, the analog voltage on the SET pin input node 206 is quantized to one of sixteen different digital bit values. The number of possible digital bit values in a given implementation is used to evenly divide the analog voltage range into groups. For example, dividing the analog voltage range of 0 to 5 V by an illustrative sixteen digital bit value possibilities results in sixteen different groups within the 0 to 5 V range. The ADC 312 detects the analog voltage on node 206 and determines to which of these sixteen groups of analog voltages the detected voltage belongs. After identifying the appropriate analog voltage group, the ADC 312 generates an output that is the digital bit value corresponding to the identified analog voltage group. The mapping scheme between analog voltage groups and corresponding digital bit values may be assigned in any desired manner. However, in at least some embodiments, the mapping scheme is determined by sorting the analog voltage groups in ascending order, sorting the defined set of digital bit values in ascending order, and correlating the analog voltage groups and digital bit values that have the same index numbers.

Figure 5:
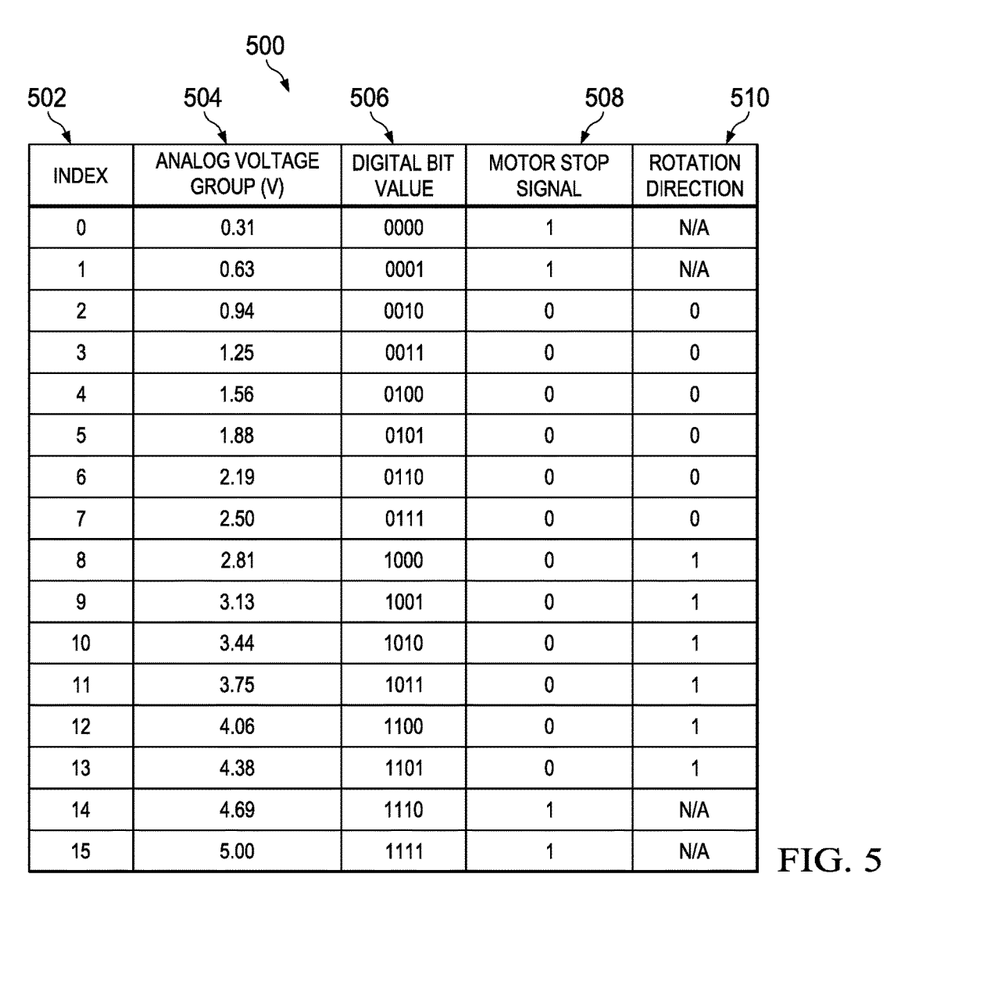
FIG. 5 is a table that cross-references analog SET pin voltages with corresponding digital bit values.

FIG. 5 is a table 500 that illustrates such mapping. Column 502 includes index numbers 0-15, meaning that the analog voltage detected on the node 206 (FIG. 3) is quantized to one of sixteen possible digital bit values. Column 504 lists the possible analog voltage groups. As explained, these groups are determined by dividing the possible analog voltage range (in this instance, 0 to 5 V) by the number of possible digital bit values (in this instance, sixteen). In this example, each analog voltage group in column 504 has a range of approximately 5V/16=0.31 V. Thus, as shown, index number 0 corresponds to a range of 0 to 0.31 V; index number 1 corresponds to a range of 0.32 V to 0.63 V, and so on. As shown, the analog voltage groups in column 504 are sorted in ascending order, although other orders are contemplated. Column 506 lists a corresponding set of digital bit values. Because the index values in column 502 range from 0 to 15, four bits are required for each digital bit value in column 506 (i.e., $2^4=16$). The digital bit values in column 506 are sorted in ascending order, although other orders are contemplated. In this way, each of the analog voltage groups in column 504 is mapped to the adjacent digital bit value in column 506. Thus, for instance, the digital bit value 0000 is mapped to the analog voltage group 0 to 0.31 V; the digital bit value 0111 is mapped to the analog voltage group 2.20 to 2.50 V; and the digital bit value 1111 is mapped to the analog voltage group 4.7 to 5.00 V. Accordingly, if the ADC 312 detects an analog voltage between 0.64 and 0.94 V (inclusive) on the node 206, it will quantize that analog voltage to the digital bit value 0010. Similarly, if the ADC 312 detects an analog voltage between 2.82 and 3.13 V (inclusive) on the node 206, it will quantize that analog voltage to the digital bit value 1001. Table 500 is merely illustrative, and the scope of disclosure is not limited to the specific mapping scheme, analog voltage groups, defined set of digital bit values, total index number (i.e., sixteen), etc. shown therein. Any and all variations and equivalents are contemplated. Columns 508 and 510 of table 500 are described further below.

Referring again to FIG. 3, the ADC 312 assigns each analog voltage detected on node 206 to the corresponding digital bit value and outputs that digital bit value on an output node 320. The digital bit value output on the output node 320 is an "indication" of the analog voltage on the SET pin input node 206. In some embodiments, an ADC 312 might not be used, and a non-quantized analog voltage may be provided to the output node 320. This analog voltage is also considered to be an "indication" of the voltage on the node 206. The remainder of this discussion assumes that the indication on node 320 is a digital bit value, but it is understood that analog voltages may be used as well.

The control logic 314 receives the indication of the voltage on the SET pin input node 206 via node 320 and uses the indication to determine whether to issue a motor stop signal on output node 322. Specifically, the control logic 314 determines whether the indication falls within a predetermined range of indication values—e.g., within the middle 75% of a defined set of possible values of the indication. For example, if the ADC 312 outputs a 4-bit digital bit value, the range of possible values is between 0000 and 1111. Thus, when the range of possible digital bit values is sorted in ascending order and each digital bit value represents a corresponding analog voltage group from a set of analog voltage groups sorted in ascending order (as explained above), the middle 75% includes the values from 0010 to 1101. The bottom 12.5% includes 0000 and 0001, and the top 12.5% includes 1110 and 1111. FIG. 5 illustrates this example. As shown in column 506, the range of possible values is from 0000 to 1111, and the middle 75% corresponds to the middle 12 values (i.e., 0010 to 1101); the bottom 12.5% corresponds to the bottom two values (i.e., 0000 and 0001); and the top 12.5% corresponds to the top two values (i.e., 1110 and 1111).

Continuing with this example, if the indication received at node 320 falls within the middle 75% of possible digital bit values, the control logic 314 outputs a LOW signal on the output node 322, as shown in column 508. This LOW signal indicates that there is no evidence that the voltage divider circuit 300 has been compromised, and the motor does not need to be stopped. However, if the indication at node 320 falls outside the middle 75% of possible values (i.e., within the bottom 12.5% or top 12.5%), the control logic 314 outputs a HIGH signal on the output node 322, as shown in column 508. This HIGH signal indicates that the voltage divider circuit 300 has likely been compromised (due to a substantial increase in voltage because of a missing ground connection adjacent to node 206, or due to a substantial decrease in voltage because of a missing connection to the voltage source 302), and the motor should be stopped. This HIGH signal is called a motor stop signal, and the manner in which it is handled is discussed below. The scope of disclosure is not limited to issuing a motor stop signal only when the indication falls outside of the middle 75% of a defined set of possible indication values. Any desired thresholds may be set to dictate when a particular indication value warrants the issuance of a motor stop signal.

A LOW output on node 322 indicates that the voltage divider circuit 300 has not been compromised and that the motor should continue rotating. In such cases, the control logic 314 outputs a directional signal on node 326 that indicates the direction in which the motor should rotate. The control logic 314 uses the indication on node 324 to determine the direction in which the motor should rotate. For example, if the indication is within a first predetermined range, the control logic 314 may output a LOW directional signal to indicate clockwise rotation, and if the indication is within a second predetermined range, the control logic 314 may output a HIGH directional signal to indicate counter-clockwise rotation. Column 510 of FIG. 5 illustrates this scheme. Index numbers 2-13, for which a motor stop signal will not be asserted and for which the motor will continue rotating, are divided into two groups: index numbers 2-7, which correspond to a LOW directional signal in column 510 and thus result in clockwise motor rotation, and index numbers 8-13, which correspond to a HIGH directional signal in column 510 and thus result in counter-clockwise rotation. For index numbers 0-1 and 14-15, the value of the directional signal is irrelevant, since the motor will be stopped. The threshold between LOW and HIGH directional signals in column 510 may be set as desired and as may be suitable. Referring again to FIG. 3, if the signal output on node 322 is HIGH, meaning that the control logic 314 issued a stop motor signal, the OR gate 316 outputs a HIGH signal on output node 324 to the motor controller 318. Alternatively, the output of the OR gate 316 may be HIGH if the PWM logic 315 outputs a HIGH signal on node 317. The PWM logic 315 comprises any suitable hardware, software and/or firmware that may generate a motor stop signal for any reason other than a defect in one or both of the resistors in the voltage divider circuit 300. If both inputs to the OR gate 316 are LOW, the output of the OR gate 316 is also LOW. The motor controller 318 receives the signal output by the OR gate 316 on node 324 and outputs one or more control signals 210 accordingly. The control signals 210 are provided to the motor driver and are used to control the motor. The control signals 210 are not limited to the signal output by the OR gate 316. Other signals also may be included as part of the control signals 210—for instance, the directional signal 326, the value of which is relevant if the node 324 is LOW and the motor continues rotating.

Figure 6:
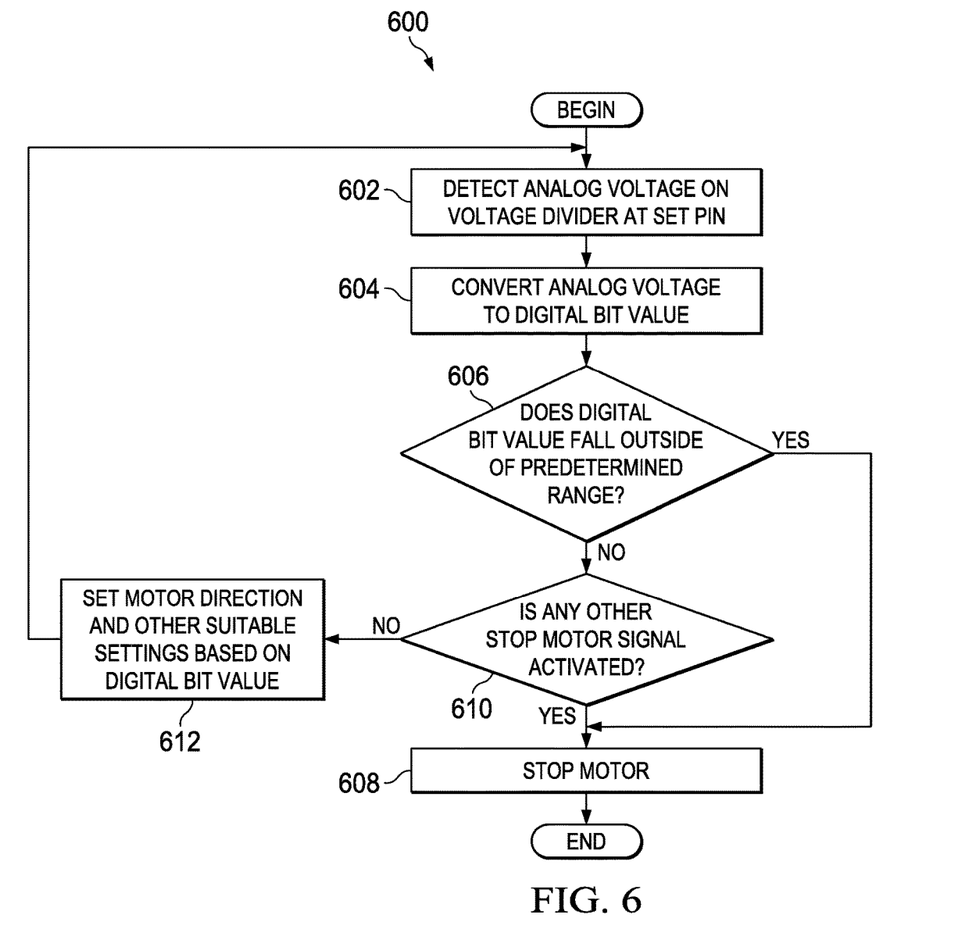
FIG. 6 is a flow diagram of a method for stopping a motor to prevent IC damage when a voltage divider circuit has been compromised.

FIG. 6 is a flow diagram of a method 600 for stopping a motor to prevent IC damage when a voltage divider circuit has been compromised. The method 600 begins with detecting an analog voltage from the voltage divider circuit at the SET pin of the motor IC (step 602). The method 600 then comprises converting the analog voltage to a digital bit value (step 604). As explained above, this may be accomplished by identifying which of multiple analog voltage groups the detected voltage belongs to, and then by quantizing the detected analog voltage to the digital bit value corresponding to the identified analog voltage group. The method 600 next includes determining whether the digital bit value falls outside of a predetermined range of digital bit values (step 606). As explained, this predetermined range of digital bit values is part of a larger, defined set of possible digital bit values. In some embodiments, the predetermined range may be the middle 75% of the defined set of possible digital bit values. In other embodiments, the predetermined range may be the middle 95%, the middle 90%, the middle 66%, the middle 50%, or some other suitable range. If the digital bit value output by the ADC falls outside of this predetermined range, the voltage divider circuit probably is defective (i.e., one or more of the bleeder resistors is defective or has become detached). Accordingly, a stop motor signal is issued, and the motor is stopped (step 608). Otherwise, the method 600 comprises determining whether any other stop motor signal has been issued—for example, by the PWM logic 315 of FIG. 3 (step 610). If so, the motor is stopped (step 608). Otherwise, the motor will not be stopped, and the method 600 comprises setting the motor direction and other suitable settings (e.g., duty cycle) based on the digital bit value (step 612). The method 600 may be modified as desired, including by adding, deleting, modifying or rearranging one or more steps.

Numerous other variations and modifications will become apparent to those skilled in the art once the above disclosure is fully appreciated. It is intended that the following claims be interpreted to embrace all such variations, modifications and equivalents.

What is claimed is:

1. A motor control system, comprising:
   a control logic configured to receive an indication of a voltage detected at a node, said indication representing a desired motor rotation direction;
   an analog-to-digital converter (ADC) positioned between said node said control logic;
   a motor controller coupled to the control logic; and
   a logical OR gate having a first input terminal coupled to the control logic, a second input terminal coupled to a pulse width modulation (PWM) logic, and an output terminal coupled to the motor controller, wherein if said voltage on the node falls outside of a predetermined range, the control logic is configured to issue a motor stop signal to the motor controller.

2. The system of claim 1, wherein said indication of the voltage is one of a predetermined number of digital bit values output by said ADC based on the voltage on said node.

3. The system of claim 2, wherein said predetermined number is sixteen.

4. The system of claim 3, wherein the control logic issues the motor stop signal if said indication of the voltage is one of the two highest or one of the two lowest of said sixteen digital bit values when the sixteen digital bit values are sorted in ascending order.

5. The system of claim 1, wherein said indication of the voltage is an analog voltage or a quantized digital bit value.

6. The system of claim 1, wherein the motor controller controls a car seat cooling fan in accordance with said motor stop signal.

7. The system of claim 1, wherein, if said indication falls within said predetermined range, the control logic issues a directional signal to the motor controller that indicates whether a motor should rotate clockwise or counter-clockwise.

8. The system of claim 1, wherein said predetermined range is the middle 75% of a defined set of possible values of said indication when said possible values are sorted in ascending order.

9. Non-transitory computer-readable medium storing instructions that, when executed by a processor, causes said processor to:
   receive an indication of a voltage present at a node, said indication representing a desired motor rotation direction, and said indication received from an analog-to-digital converter (ADC) positioned between said node said processor;
   determine whether said indication of the voltage falls outside a predetermined range; and
   issue a motor stop signal if said indication of the voltage falls outside the predetermined range, wherein the processor is coupled to a first input terminal of a logical OR gate which has a second input terminal coupled to a pulse width modulation (PWM) logic and an output coupled to a motor controller.

10. The medium of claim 9, wherein said voltage at the node is configured to range between 0 and 5 Volts, and wherein said indication of the voltage at the node is a digital bit value selected from a range between 0000 and 1111, inclusive.

11. The medium of claim 10, wherein each digital bit value in said range of digital bit values is assigned to a corresponding analog voltage group, and wherein each analog voltage group falls within a range of possible voltages at the node.

12. The medium of claim 9, wherein said predetermined range is the middle 75% of a defined set of possible values of said indication.

13. The medium of claim 9, wherein the motor controller is a car seat cooling fan motor controller.

14. A method for controlling a motor, comprising:
   obtaining an indication of a voltage present at a node, said indication received from an analog-to-digital converter (ADC) positioned between said node a control logic;
   determining whether said indication of the voltage falls outside of a predetermined range;
   issuing a motor stop signal if said indication of the voltage falls outside of the predetermined range, wherein said motor stop signal is provided to a first input terminal of a logical OR gate which has a second input terminal coupled to pulse width modulation (PWM) logic and an output terminal coupled to a motor controller; and
   stopping a motor via the motor controller based on the motor stop signal.

15. The method of claim 14, further comprising quantizing said voltage present at the node to obtain said indication.

16. The method of claim 14, wherein said predetermined range corresponds to the middle 90% of a defined set of digital bit values.

17. The method of claim 14, further comprising rotating said motor in a direction determined using said indication.

18. The method of claim 14, wherein said motor is a car seat cooling fan motor.

19. The method of claim 14, wherein said indication is selected from a group of sixteen digital bit values.

* * * * *

UNITED STATES PATENT AND TRADEMARK OFFICE
CERTIFICATE OF CORRECTION

PATENT NO. : 10,158,308 B2
APPLICATION NO. : 15/186050
DATED : December 18, 2018
INVENTOR(S) : Takashi Ogawa et al.

Page 1 of 1

It is certified that error appears in the above-identified patent and that said Letters Patent is hereby corrected as shown below:

In the Claims

In Column 8, Line 30, "said processor;" should read -- and said processor; --.
In Column 8, Line 57, "between said node a control logic;" should read -- between said node and a control logic; --.

Signed and Sealed this
Seventh Day of May, 2019

Andrei Iancu
*Director of the United States Patent and Trademark Office*